United States Patent [19]
Monckton

[11] Patent Number: 5,098,134
[45] Date of Patent: Mar. 24, 1992

[54] PIPE CONNECTION UNIT

[76] Inventor: Walter J. B. Monckton, 1 Cromwell Street, Cooma, New South Wales 2630, Australia

[21] Appl. No.: 454,415

[22] Filed: Dec. 21, 1989

[30] Foreign Application Priority Data

Jan. 12, 1989 [AU] Australia .................... PJ2231

[51] Int. Cl.$^5$ .................................. F16L 37/092
[52] U.S. Cl. ........................... 285/38; 285/255; 285/383; 285/421; 285/419; 411/310; 411/314
[58] Field of Search ........... 285/38, 373, 419, 383, 285/421, 323, 242, 249, 255; 403/303, 310, 311, 313, 314

[56] References Cited

U.S. PATENT DOCUMENTS

| | | | |
|---|---|---|---|
| 92,289 | 7/1869 | Dunning | 403/314 |
| 582,137 | 5/1897 | Dockery | 285/177 X |
| 1,042,852 | 10/1912 | Von Boden | 285/383 X |
| 1,725,713 | 8/1929 | Jobe | 285/419 X |
| 2,507,261 | 5/1950 | Mercier | |
| 3,135,537 | 6/1964 | Scott | 285/383 X |
| 4,363,505 | 12/1982 | Smith | 285/423 X |

FOREIGN PATENT DOCUMENTS

| | | | |
|---|---|---|---|
| 1234206 | 10/1960 | France | 285/249 |
| 491710 | 12/1955 | Italy | 285/421 |
| 297987 | 10/1928 | United Kingdom | |
| 1434117 | 5/1976 | United Kingdom | |

Primary Examiner—Randolph A. Reese
Assistant Examiner—Heather Chun
Attorney, Agent, or Firm—Zarley, McKee, Thomte, Voorhees & Sease

[57] ABSTRACT

A connector for joining the ends of two pipes has a pair of half-sleeves, which fit around the pipe ends to form an inner sleeve. The inner sleeve has a tapered or conical outer surface, against which an outer sleeve presses. The outer sleeve is a single-piece sleeve with a tapered bore, the angle of the taper of which matches the angle of taper of the outer surface of the inner sleeve. The outer sleeve is slid over the inner sleeve and is clamped in intimate contact with the inner sleeve by a nut which is tightened onto a threaded end of the outer sleeve while an annular, inwardly-projecting flange of the nut bears against the ends of the half-sleeves. The surfaces of the half-sleeves are coated with adhesive before being placed around the pipe ends; this adhesive cures while the joint components are clamped together. Preferably each half-sleeve has a central rib at its mid-point, against which the ends of the pipes being joined abut.

10 Claims, 4 Drawing Sheets

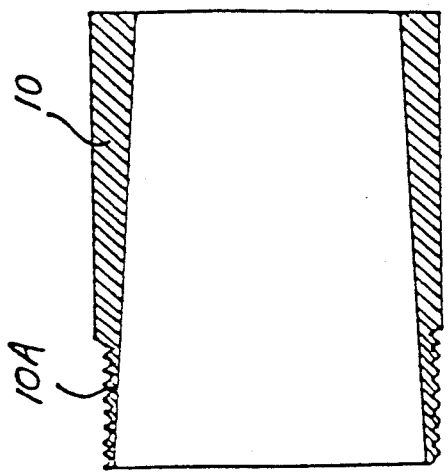
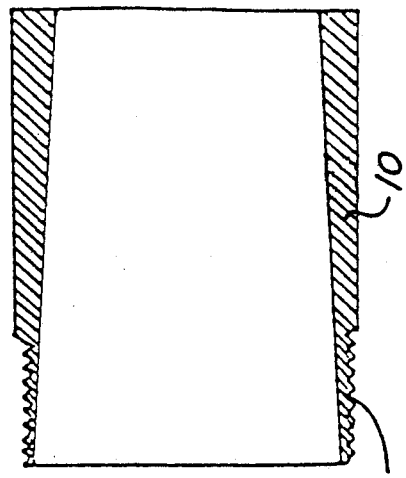
FIG. 2.    FIG. 3.
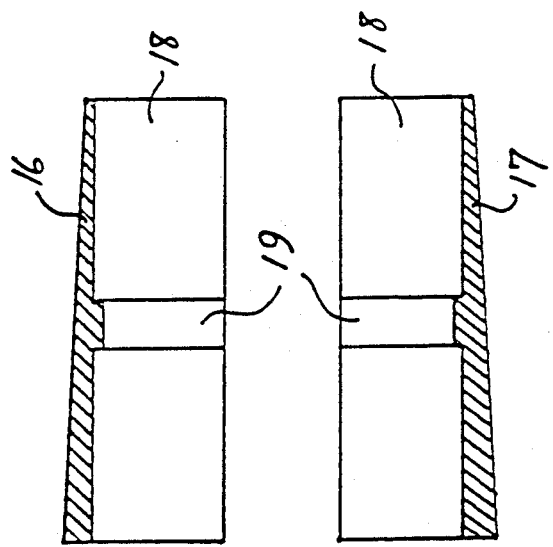
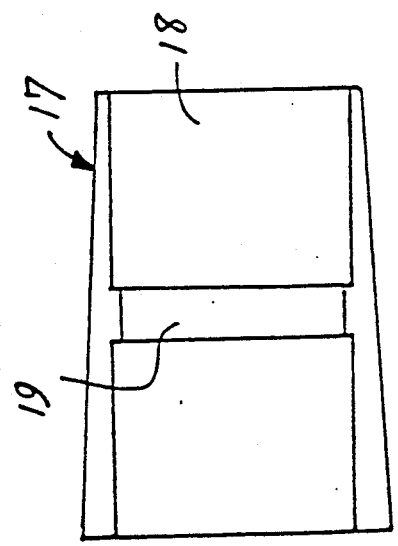
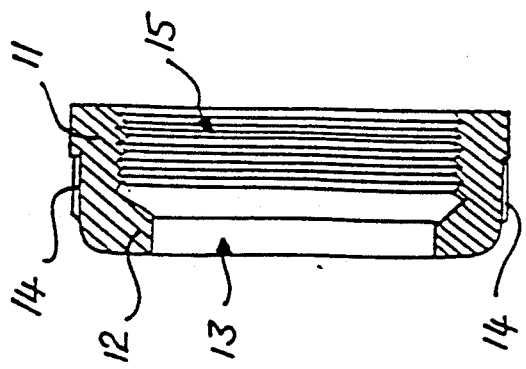
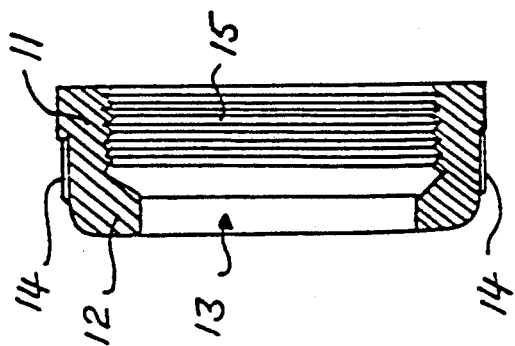

5,098,134

PIPE CONNECTION UNIT

TECHNICAL FIELD

This invention concerns pipe joining. More particularly, it concerns the "bridging" or coupling of ends of a pair of pipes, or the two ends of a broken or fractured pipe. The invention uses a pair of half-sleeves which, when held together, form a sleeve having (i) an internal diameter substantially equal to the outside diameter of the pipe ends to be coupled and (ii) a tapered external surface. The sleeve thus formed is retained in position by an outer sleeve having a bore which is tapered to match the taper of the inner sleeve.

BACKGROUND OF THE INVENTION

A large number of pipe coupling arrangements have been proposed in the past. Among the most successful are the "Milne joint" (in which a washer is compressed until it bears against a pipe), the "barrel union" (in which an O-ring has pressure applied to it to seal the connection between the pipe ends), and the "slip-fix" coupling (which also relies upon the pressure applied to an O-ring to establish the seal between the coupled pipe ends). Other proposals which have not been successful (in that they are not available on the Australian market) are featured in the specifications of UK patent No. 1,357,412, UK patent application No. 8415399 (publication No. GB-2166825A, the invention of which was conceived primarily for connecting the ends of hoses), U.S. Pat. No. 4,095,826, U.S. Pat. No. 3,667,782 and U.S. Pat. No. 4,548,428.

All of these prior art connectors are either incapable of withstanding high pressures, or are very expensive to produce and thus are not economically viable connectors. Few of these pipe connection arrangements could be used to join the ends of a broken pipe when the pipe which has fractured is fixed in position (for example, by being buried underground) and there is no prospect of axial movement of the two lengths of pipe.

DISCLOSURE OF THE PRESENT INVENTION

The prime object of the present invention is to provide a low cost apparatus for pipe end connection, which can be used to connect the ends of pipes, including the ends of a broken pipe which is fixed in position and there is no prospect of axial movement of the pipe ends relative to each other, and which provides a joint which is capable of withstanding high pressures without failing.

This objective is achieved by providing a coupling unit which includes a pair of half-sleeves which can be placed adjacent to each other to form a sleeve with a uniform bore and with a tapered outer surface. The bore of this sleeve formed from the half-sleeves is substantially equal in diameter to (but fractionally less in diameter than) the outer diameter of the ends of the pipes to be joined. This sleeve is held in position around the pipe joint by a single-piece outer sleeve which has a tapered bore, the angle of the taper of which is substantially equal to the taper angle of the inner sleeve formed from the half-sleeves just described. Normally the outer surface of the outer sleeve will have a uniform diameter, but this is not essential. A threaded end of the outer sleeve enables a nut to be used to force the tapered two-piece sleeve into the outer sleeve, and thus force the two-piece inner sleeve against the pipe or pipes while an adhesive, applied to the contacting surfaces of the pipe ends and the inner half-sleeves, cures and forms a good bond between these components.

Thus, according to the present invention, there is provided apparatus for connecting together the ends of two axially-aligned pipes, said apparatus comprising:

(a) a pair of half-sleeves, each dimensioned to fit around substantially half of the outer curved surfaces of the ends of the pipes, whereby said pair of half-sleeves forms an inner sleeve of a connector, said inner sleeve having (i) a bore which is substantially equal to, but fractionally less than, the outer diameter of the pipes, and (ii) a tapered outer surface;

(b) an outer sleeve formed as single article, said outer sleeve having (i) a tapered bore, the angle of taper of which is substantially equal to the angle of taper of the outer surface of the inner sleeve, and (ii) a threaded region at one end of the outer sleeve, said one end being the end of the outer sleeve where the bore has its maximum diameter; and (c) an annular nut, adapted to be threaded over the threaded end region of the outer sleeve, said annular nut having an inwardly projecting annular flange at one end thereof, said annular flange defining a circular aperture which has a diameter greater than the diameter of one of said pipe ends but less than the maximum diameter of the bore of the outer sleeve.

Preferably, each half-sleeve has an inwardly projecting rib, or at least one inwardly directed projection, at substantially its mid-point, to provide a location means for the ends of the pipes within the inner sleeve.

The way in which the present invention is used to join a pair of pipe ends, and the benefits of the present invention, will be more readily appreciated from the following description of embodiments of the present invention. In this description, reference will be made to the accompanying drawings.

BRIEF DESCRIPTION OF THE DRAWINGS

FIG. 2 is a sectional view at A—A of the components of FIG. 1.

FIG. 3 is a sectional view at B—B of the components of FIG. 1.

DETAILED DESCRIPTION OF THE ILLUSTRATED EMBODIMENTS

The present invention has features which are similar to the pipe connector described in the specification the closest prior art to the present invention. The pipe connector described in that specification has a pair of part-cylindrical shells which have a tapered or conical outer shape, and thus equate with the half-sleeves of the present invention. The pipe connector of that specification also has an outer sleeve with a conical or tapered bore, that can be pushed over the inner sleeve formed, about the ends of two axially-aligned pipes, by the part-cylindrical half shells. In use, the half shells are coated with adhesive on both sides. The coated half shells are placed over the pipe ends and the outer sleeve, which previously has been positioned around one of the pipes, is pushed over the coated outer surface of the half shells, to hold them together and in contact with the pipe ends.

Unfortunately, only manual pressure can be applied to the pipe joint in this manner, and it is difficult for a person using that type of joint to hold the components together, without slipping, until the adhesive sets. If each half shell is coated with a contact adhesive, then it is almost impossible to push the outer sleeve over the inner sleeve formed by the half shells without contact-—and immediate bonding together—of the adjacent surfaces. Thus the arrangement described in the specification of UK patent No. 1,434,117 cannot be used to establish a pipe joint which is capable of withstanding even moderate pressures within the joined piping.

In contrast, the present invention enables the surfaces to be bonded together to be clamped against each other while the adhesive sets, thus enabling reliable pipe joints, which are able to withstand high pressures, to be established.

The present invention is particularly useful in the situation where an existing PVC pipe has been broken and the pipe ends at the break in the pipe cannot be moved axially away from, or towards, each other. Such a situation is found in many pipe installations —including an underground installation of a PVC pipe. Normally, in such a case, the first step in using the present invention to join the broken ends of the pipe will be to trim the ends so that the end apertures of the pipe are substantially circular (that is, the end edges of the pipe are substantially at right angles to the pipe axis). Subsequent steps will now be described with reference to the drawings.

Figure 1:
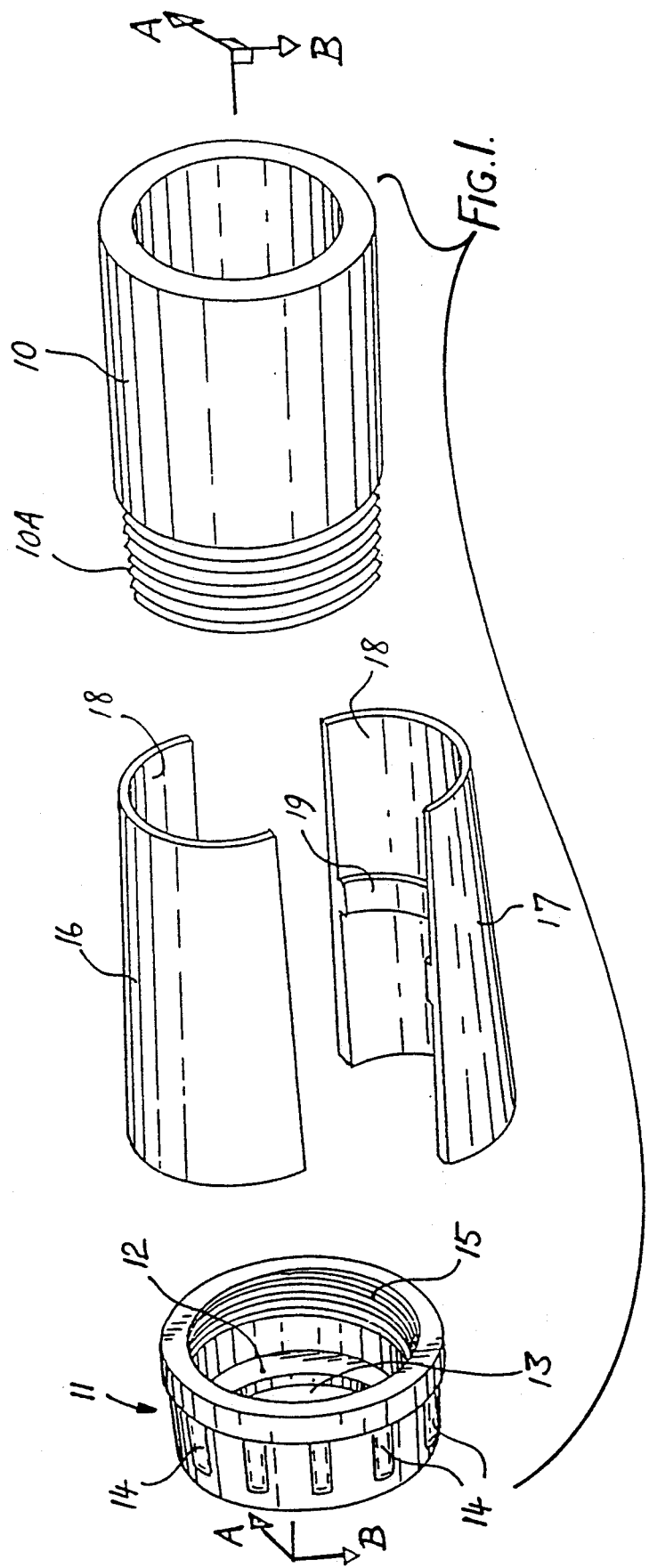
FIG. 1 is an exploded view of the components of a preferred embodiment of the present invention.

Before the pipe joint is effected, the outer sleeve 10 of the present invention is positioned around one pipe end 20 and the nut 11 of the present invention is positioned around the other pipe end 21. As shown particularly in FIG. 1, the nut 11 has an inwardly extending annular flange 12, the inner edge of which 15 defines a circular aperture 13. The diameter of the circular aperture 13 is greater than—but only slightly greater than—the outer diameter of the pipe end 21. Preferably the outer surface of the nut 11 is provided with raised ribs 14 or similar means to facilitate the gripping and rotation of the nut.

The internal thread 15 of the nut 11 is complementary to the thread on the externally threaded end portion 10A of the outer sleeve 10. The bore of the outer sleeve 10 is tapered (or frusto-conical) with the largest bore diameter being at the end of the sleeve which has the threaded portion 10A. In the illustrated forms of the outer sleeve 10, the outer surface of the sleeve 10 is a right cylindrical surface, but the outer surface may have any suitable shape, and may be provided with ridges or ribs, projections or flat regions to facilitate gripping of the outer sleeve.

To effect the joining of the pipe ends, the half-sleeves 16 and 17 are coated with an adhesive and are held against the curved outer surfaces of the pipe ends to form an almost complete sleeve joining the pipe ends. Each half-sleeve has an essentially right cylindrical inner surface 18 and a tapered outer surface. The angle of taper of the outer surface of each half-sleeve matches the angle of taper of the bore of the outer sleeve 10.

Figure 4:
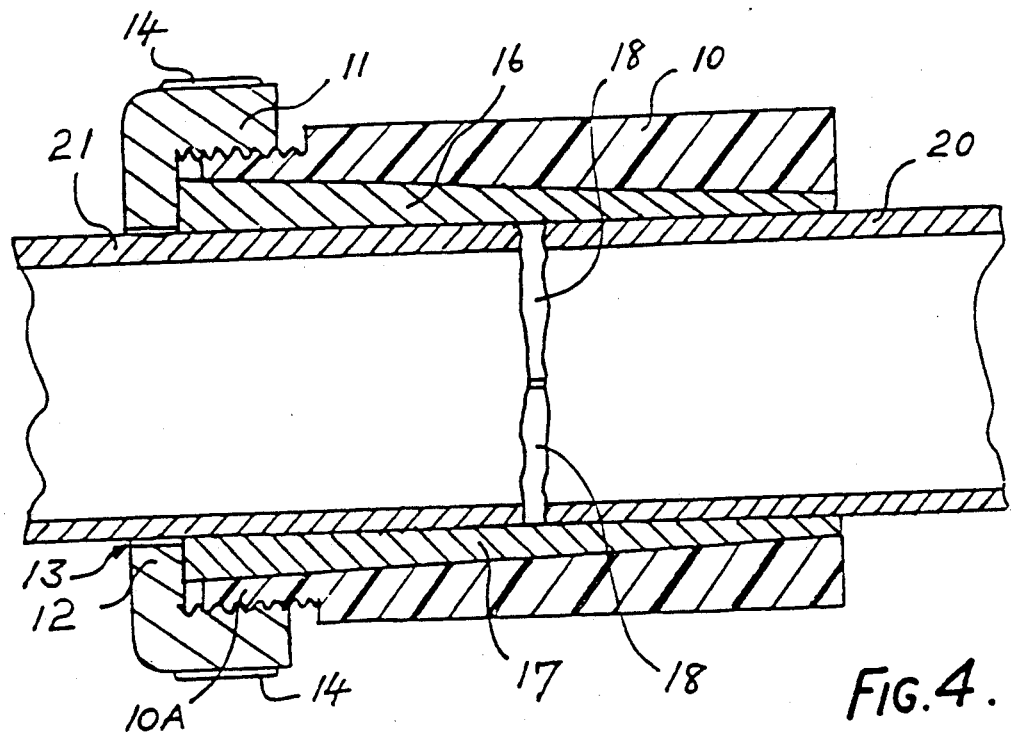
FIG. 4 is a sectional view through a completed joint made with a non-preferred embodiment of the present invention.
Figure 5:
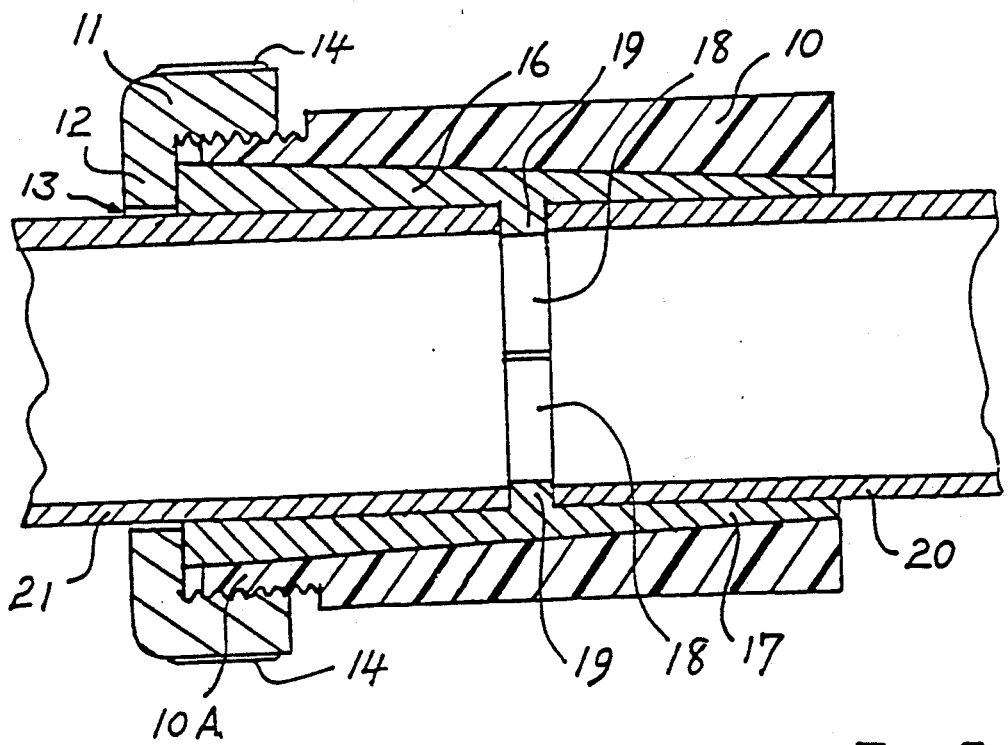
FIG. 5 is a sectional view through a pipe joint made with the preferred form of the present invention.

In the preferred embodiment of the present invention, each half-sleeve is provided with an inwardly extending ridge or rib 19 of rectangular cross-section. This rib 19—which may be replaced by one or more inwardly extending projections—acts as a locating stop for a pipe end 20 or 21. As will be apparent from FIG. 4, the rib 19 or its equivalent is not an essential feature of the present invention. If present, the rib or ridge 19 (or an equivalent projection) will be abutted by each pipe end when the pipes are joined. However, when coupling together the ends of a broken pipe which cannot be moved axially, the gap between the pipe ends (after they have been trimmed) may be greater than the width of the rib or ridge 19. In that case, only one pipe end will abut against an edge of the rib 19.

After the adhesive-coated half-sleeves 16 and 17 have been positioned around the pipe ends, the outer sleeve is moved over them until the surface of the bore of the outer sleeve comes into contact with the outer surfaces of the half-sleeves. At this point, the "thick" ends of the half-sleeves will be projecting a short distance beyond the threaded end 10A of the outer sleeve 10. The nut 11 is then screwed on to the threaded end 10A until the annular flange 12 of the nut comes into contact with the ends of the half sleeves 16 and 17. Further rotation of the nut 11 forces the outer sleeve and the half sleeves into intimate contact, and clamps them together (see FIG. 4). They are clamped in this manner until the adhesive has cured and the pipe ends, the inner half-sleeves and the outer sleeve are bonded to each other. It will be normal practice to leave the nut 11 in the position in which it has clamped the pipe connection components together.

Figure 6:
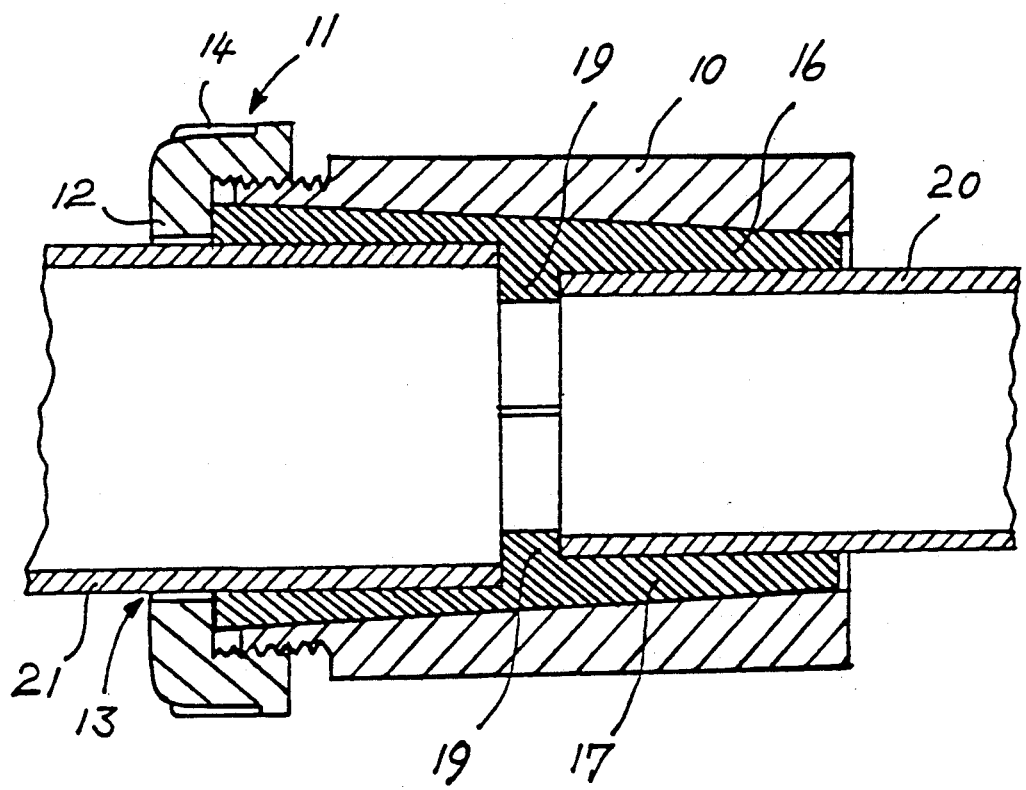
FIG. 6 is a sectional view through a pipe joint made using the present invention when the pipes that are joined have different diameters.

If pipes of differing outer diameter are to be connected, a variation of the embodiment described above is required. That variation is illustrated in FIG. 6. It comprises a stepped inner cylindrical surface of each half sleeve. The "step" or change in diameter will normally be at the inwardly projecting ridge or rib 19, although that is not essential. In all other respects, the joining together of the pipes will involve the same sequence of events described above.

A number of PVC (polyvinylchloride) pipes have been joined together using prototypes of the present invention fabricated from a polycarbonate plastics material. In some of these pipe connections, the adhesive used was a contact adhesive. In other connections, a solvent was used as the adhesive (so that the components were, in fact, solvent welded). Each of those pipe connections were tested in the Hydraulics Laboratory of the Snowy Mountains Hydroelectricity Authority in Cooma, Australia. Each joint withstood a pressure of 500 p.s.i. maximum pressure that could be applied using equipment in the laboratory) without failing.

For comparison, two pairs of PVC pipes were joined using the invention of UK patent No. 1,434,117. Tests with those joints were performed at the laboratory of Hardie Iplex Pty Ltd in Sydney, Australia. Each joint failed when a low gas pressure was applied to the interior of the joined pipes.

Thus it is clear that the present invention does not constitute apparatus for effecting a routine, common connection of PVC piping, but is apparatus for making a specialised repair and alteration joint, anywhere within an existing pipeline, whether or not axial movement of the pipe ends being joined is possible. the joint so created has a final strength equal to, or greater than, that of the unbroken pipeline A particularly useful application of the present invention is in the connection of ends of PVC sewerage pipes or similar thin-walled PVC pipes. Such pipes tend to fracture or become distorted when a conventional clamp is applied to them to effect a conventional joining of the ends of the pipes. When the present invention is used, a controlled and even pressure is applied to the ends of the pipes that are being joined, so that the pipe ends are neither fractured nor distorted. In addition, the connection that is achieved with the present invention is impervious to soil water and tree roots. (Tree roots are a major cause of blockages in sewerage pipes.)

Although the present invention has been used so successfully on PVC piping, it may also be used to connect together pipes which have been made from another material, and pipes of different materials. The components of the connector of the present invention may be fabricated from any suitable material, including metal (not preferred) and polycarbonate plastics materials.

A particular advantage of the present invention is that it can be used with the nut first positioned about either of the pipe ends, and the outer sleeve positioned on the other pipe end. The choice of which pipe end is surrounded for which component is often arbitrary. However, in situations where access to the pipe ends is difficult, such as in the case of a broken pipe in cramped locations, the ability to put either component around either pipe end can be most beneficial.

A non-preferred variation of the present invention, which is mentioned here for the sake of completeness, is the use of three (or four, or more) part-sleeves to construct the inner sleeve of the pipe joint, instead of using only half-sleeves. Each part-sleeve would cover the appropriate portion only of the pipe ends.

It will be appreciated that although specific (and exemplary) embodiments of the present invention have been illustrated in the drawings and have been described above, variations from those embodiments, which have not been foreshadowed in the above description, are possible without departing from the present inventive concept.

I claim:

1. Apparatus for connecting together the ends of two axially-aligned pipes, said apparatus comprising:
   (a) a pair of half-sleeves, each dimensioned to fit around substantially half of the outer curved surfaces of the ends of the pipes, whereby said pair of half-sleeves forms an inner sleeve of a connector said inner sleeve having (i) a bore which is substantially equal to, but fractionally less than, the outer diameter of the pipes, and (ii) an outer surface which is uniformly tapered in one direction for the entire length;
   (b) an outer sleeve formed as single article, said outer sleeve having (i) a tapered bore, extending the entire length of said outer sleeve and the angle of taper of said tapered bore being substantially equal to the unidirectional angle of taper of the outer surface of the inner sleeve, and (ii) an externally threaded region at one end of the outer sleeve, said one end being the end of the outer sleeve where said bore of said outer sleeve has the maximum diameter;
   (c) an annular nut, adapted to be threaded over the threaded end region of the outer sleeve, said annular nut having an inwardly projecting annular flange at one end thereof, said annular flange defining a circular aperture which has a diameter greater than the diameter of one of said pipe ends but less than the maximum diameter of the bore of the outer sleeve; whereby, when said apparatus is used to connect together two pipe ends, the end of said inner sleeve which has the maximum outer diameter abuts against said annular flange so as to drive said sleeves in axial relation to one another thus wedging said sleeves into tight engagement with one another and so as to force said inner sleeve into tight engagement with said pipe.

2. Apparatus as defined in claim 1 in which each half-sleeve has an inwardly projecting rib at substantially its mid-point, to provide a location means for the ends of the pipes within the inner sleeve.

3. Apparatus as defined in claim 1, in which each half-sleeve has at least one projection from the inner surface thereof, at substantially its mid-point, to provide locating means for the ends of the pipes within the inner sleeve.

4. Apparatus as defined in claim 2, in which said rib is rectangular in cross-section.

5. Apparatus as defined in claim 1, in which said nut is provided with a plurality of ribs projecting from its outer lateral surface, to facilitate the manual rotation of the nut.

6. Apparatus as defined in claim 5, in which the outer lateral surface of the outer sleeve is provided with ribs or flat regions or protrusions therefrom to facilitate the gripping thereof.

7. Apparatus as defined in claim 1, in which said two axially-aligned pipes have different outer diameters, and the radius of curvature of the inner surface of each half-sleeve changes from a value substantially equal to the radius of the outer surface of one of said pipes to a value substantially equal to the radius of the outer surface of the other of said pipes at substantially the mid-point of the half-sleeve.

8. Apparatus as defined in claim 7, in which each half-sleeve has an inwardly projecting rib at the change of radius of curvature of the inner surface of the half-sleeve.

9. Apparatus as defined in claim 8, in which said rib has a substantially rectangular cross-section.

10. Apparatus as defined in claim 1, in which at least one of said pipes is fabricated from a polyvinylchloride material.

* * * * *